(12) United States Patent
Han et al.

(10) Patent No.: US 10,975,218 B2
(45) Date of Patent: Apr. 13, 2021

(54) NANOPOROUS MICRO-SPHERICAL POLYIMIDE AEROGELS AND METHOD FOR PREPARING SAME

(71) Applicant: Haksoo Han, Seoul (KR)

(72) Inventors: Haksoo Han, Seoul (KR); Jinuk Kwon, Gyeonggi-do (KR); Jinyoung Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 648 days.

(21) Appl. No.: 16/097,026

(22) PCT Filed: Sep. 25, 2014

(86) PCT No.: PCT/KR2014/008940
§ 371 (c)(1),
(2) Date: Oct. 26, 2018

(87) PCT Pub. No.: WO2016/047821
PCT Pub. Date: Mar. 31, 2016

(65) Prior Publication Data
US 2019/0127547 A1 May 2, 2019

(51) Int. Cl.
*C08J 9/28* (2006.01)
*C08G 73/10* (2006.01)
*C08L 79/08* (2006.01)
*C08K 3/08* (2006.01)
*C08K 3/34* (2006.01)
*C08K 3/36* (2006.01)
*C08G 101/00* (2006.01)

(52) U.S. Cl.
CPC .............. *C08J 9/286* (2013.01); *C08G 73/10* (2013.01); *C08G 73/1014* (2013.01); *C08G 73/1017* (2013.01); *C08G 73/1032* (2013.01); *C08G 73/1046* (2013.01); *C08G 73/1064* (2013.01); *C08K 3/08* (2013.01); *C08K 3/346* (2013.01); *C08K 3/36* (2013.01); *C08L 79/08* (2013.01); *C08G 2101/0091* (2013.01); *C08J 2201/0502* (2013.01); *C08J 2205/026* (2013.01); *C08J 2205/042* (2013.01); *C08J 2379/08* (2013.01)

(58) Field of Classification Search
CPC .. C09D 179/08; C08G 73/10; C08J 2205/026; C08J 3/16; C08J 9/28; C08J 2201/0543
See application file for complete search history.

(56) References Cited

U.S. PATENT DOCUMENTS

| 3,698,345 A | 10/1972 | Vaughan et al. |
| 6,399,669 B1 * | 6/2002 | Suzuki ...................... C08J 9/28 |
| | | 521/183 |
| 2004/0132845 A1 | 7/2004 | Rhine et al. |
| 2012/0231979 A1* | 9/2012 | Peiffer .................. C09K 8/035 |
| | | 507/117 |

FOREIGN PATENT DOCUMENTS

| JP | 2000-154273 | 6/2000 |
| KR | 1003804250000 | 4/2003 |

OTHER PUBLICATIONS

Serafini et al.,"Processable High-Temperature-Resistant Addition-Type Polyimide Laminating Resins", National Aeronautics and Space Administration, May 1973, 17 pages.
Wu et al., "Preparation and Performance of Polyimide-Reinforced Clay Aerogel Composites", Ind. Eng. Chem. Res., 2012, 51, pp. 12821-12826.
Kwon et al., "Preparation and Characterization of Spherical Polyimide Aerogel Microparticles", Macromol. Mater. Eng., 2014, 299, pp. 1081-1088.

* cited by examiner

Primary Examiner — Gregory Listvoyb
(74) Attorney, Agent, or Firm — Duane Morris LLP; Gregory M. Lefkowitz; Brandon A. Chan

(57) ABSTRACT

The present disclosure relates to nanoporous micro-spherical polyimide aerogels and a method for preparing the same. The use of the method for preparing polyimide aerogels, according to an embodiment of the present disclosure, enables the preparation of the polyimide aerogels through a low-temperature process, and thus can save energy and time when compared with existing preparing methods, can reduce production costs, and can prepare spherical polyimide aerogels, which are micro-sized uniform particles, having excellent chemical stability, thermal insulation characteristics, and absorption-desorption characteristics while having nano-sized pores. The spherical polyimide aerogels can be applied to various fields, such as an insulator, a drug delivery medium, and a catalyst supporter, due to excellent physical properties thereof.

2 Claims, 4 Drawing Sheets

NANOPOROUS MICRO-SPHERICAL POLYIMIDE AEROGELS AND METHOD FOR PREPARING SAME

CROSS-REFERENCE TO RELATED APPLICATIONS

This application is a § 371 national stage entry of International Application No. PCT/KR2014/008940, filed on Sep. 25, 2014, the entire contents of which are incorporated herein by reference.

TECHNICAL FIELD

The present disclosure relates to a nanoporous microspherical polyimide aerogel and a method for preparing the same. More particularly, the present disclosure relates to a spherical polyimide aerogel, which is obtained in the form of an aerogel from a polyamic acid precursor composition, has excellent chemical stability, heat insulation property and adsorption/desorption characteristics, and includes uniform micro-sized particles having nano-sized pores, and a method for preparing the same.

BACKGROUND ART

Since aerogels were found in the 1930s, many studies have been conducted about aerogels. A silica aerogel, which is the most typical type of aerogels, has excellent physical properties and is an ultralight advanced material having high applicability in a broad range of industries, including energy, environment, electric/electronic, space, medical fields, particularly in the fields of aerospace, heat insulation materials for buildings, medical equipment, such as storage and transport of body organs, drug delivery media, catalytic supports, dielectric films having a low dielectric constant, or the like.

However, it is required to prevent destruction of micropores in order to obtain a silica aerogel having excellent physical properties. To prevent destruction of micropores, a silica aerogel is obtained by a dry process using supercritical carbon dioxide. However, such a supercritical dry process requires high pressure and high temperature, and thus is disadvantageous in that it has a risk of safety accidents, has a difficulty in carrying out a continuous process due to a limited autoclave container size, and requires high production cost.

To solve the above-mentioned problems, many studies have been conducted to prepare aerogels by using various materials. Particularly, various attempts have been made to obtain aerogels by using polymers.

A polyimide resin is an advanced chemical material spotlighted in the fields requiring high heat resistance, low insulation property and high strength, has a chemical structure which is not decomposed even at a high temperature of 400° C. or more, has a small thickness and shows excellent flexibility. Thus, since such polyimide resins were developed by Dupont Co., they haven been used widely as key materials in the field of aerospace, IT, automobiles, semiconductors, displays, or the like. Although NASA, etc. developed an aerogel sheet using a polyimide, the method for manufacturing the aerogel sheet has a limitation in type of polyimide, uses a supercritical carbon dioxide dry process, and requires high production cost. Moreover, it is advantageous to prepare an aerogel in a particle shape, not a sheet-like shape, so that the aerogel may be used as a drug delivery medium, catalytic support or heat insulation material. Thus, there is a need for developing a novel type of polyimide aerogel.

Therefore, it is expected that preparation of a spherical polyimide aerogel, which includes micro-sized uniform particles having nano-sized pores and can substitute for a silica aerogel, through a low-temperature process using a polyimide material having excellent physical properties can solve the above-mentioned disadvantages of a silica aerogel and sheet-type polyimide aerogel.

DISCLOSURE

Technical Problem

A technical problem to be solved by the present disclosure is to provide a nanoporous microspherical polyimide aerogel which includes uniform micro-sized particles having nano-size pores and excellent chemical stability, heat insulation property and adsorption/desorption characteristics, and a method for preparing the same.

Technical Solution

In one general aspect, there is provided a method for preparing a polyimide aerogel, including step (B) of heating a first container and a second container positioned in a sealed reactor, wherein the first container receives a polyamic acid solution containing a polyamic acid represented by the following Chemical Formula 1 and a solvent, and the second container receives a non-solvent.

[Chemical Formula 1]

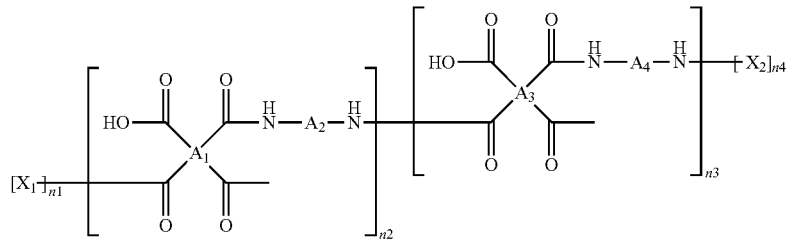

In another aspect, there is provided a polyimide aerogel having a structure represented by the following Chemical Formula 2.

[Chemical Formula 2]

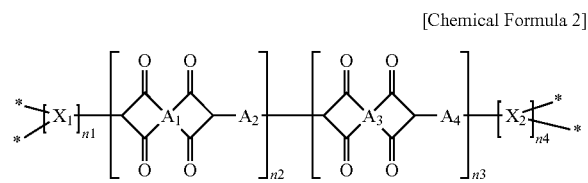

In Chemical Formula 1 and Chemical Formula 2,

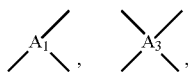

-$A_2$-, -$A_4$-, —$X_1$, —$X_2$, n1, n4, n2 and n3 are the same as defined herein.

Advantageous Effects

When using the method for preparing a nanoporous microspherical polyimide aerogel according to an embodiment of the present disclosure, it is possible to obtain the aerogel through a low-temperature process, and thus to save time and energy as compared to the existing preparation methods. It is also possible to reduce the production cost, and to provide a spherical polyimide aerogel which includes uniform micro-sized particles having nano-sized pores and excellent chemical stability, heat insulation property and adsorption/desorption characteristics. The nanoporous microspherical polyimide aerogel may be applied to various industrial fields, including heat insulation materials, drug delivery media and catalytic supports, or the like.

BEST MODE

Figure 1:
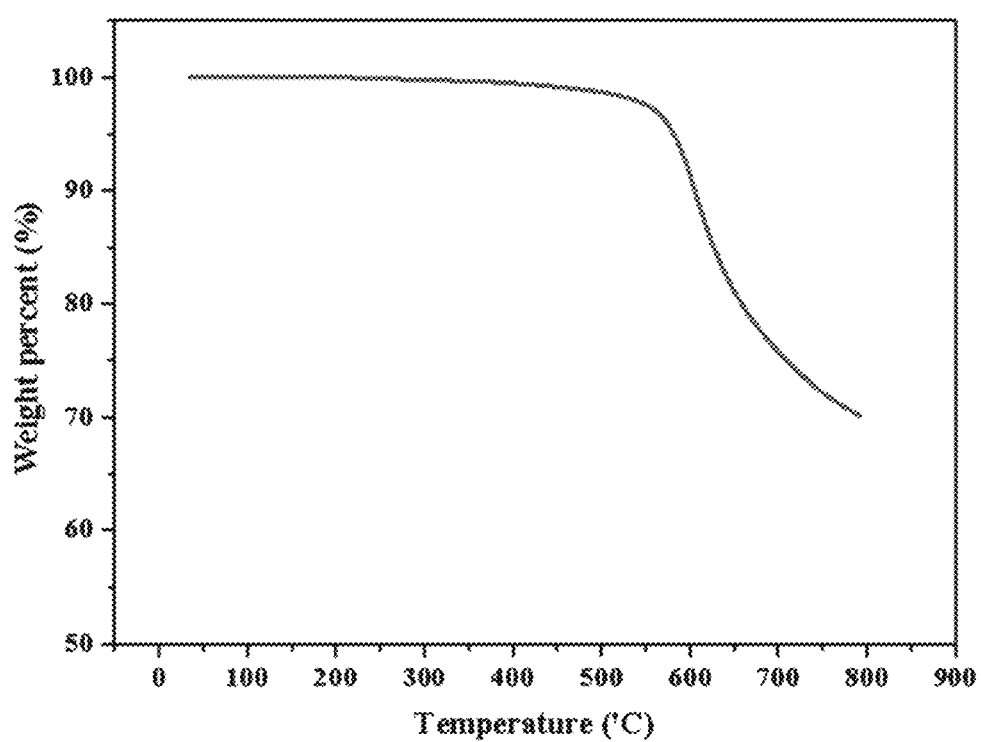
FIG. 1 is a graph illustrating the results of thermogravimetric analysis of the nanoporous microspherical polyimide aerogel using a polyamic acid precursor according to an embodiment of the present disclosure.

In one aspect, there is provided a method for preparing a polyimide aerogel, including step (B) of heating a first container and a second container positioned in a sealed reactor. The first container receives a polyamic acid solution containing a polyamic acid and a solvent, the second container receives a non-solvent, and the polyamic acid is represented by the following Chemical Formula 1.

[Chemical Formula 1]

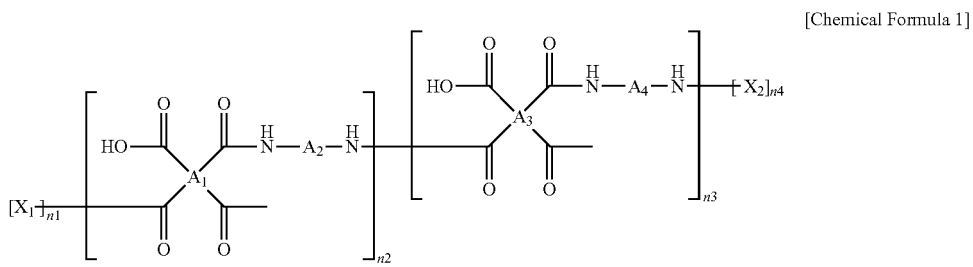

Herein,

are the same or different, and each independently has any one structure selected from the following Chemical Formula 3a to Chemical Formula 3f.

[Chemical Formula 3a]

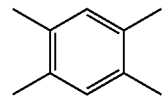

[Chemical Formula 3b]

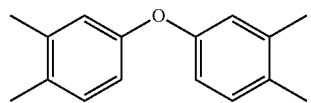

[Chemical Formula 3c]

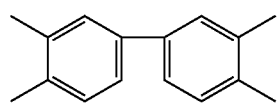

[Chemical Formula 3d]

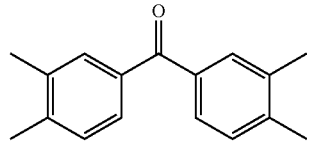

[Chemical Formula 3e]

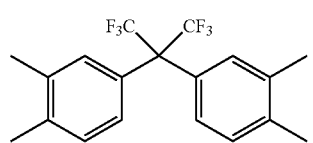

[Chemical Formula 3f]

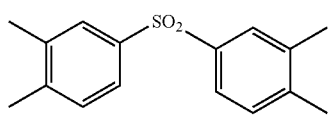

In addition, -A$_2$- and -A$_4$- are the same or different, and each independently has any one structure selected from the following Chemical Formula 4a to Chemical Formula 4j.

[Chemical Formula 4a]

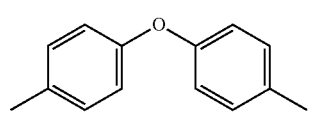

[Chemical Formula 4b]

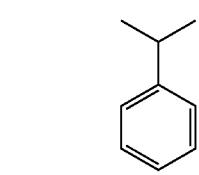

[Chemical Formula 4c]

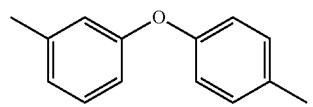

[Chemical Formula 4d]

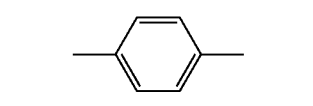

[Chemical Formula 4e]

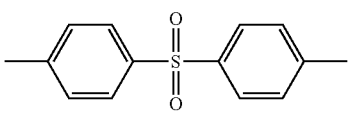

[Chemical Formula 4f]

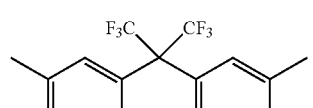

[Chemical Formula 4g]

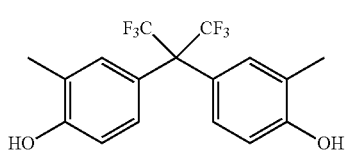

[Chemical Formula 4h]

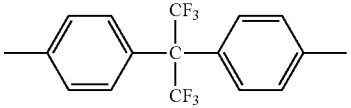

[Chemical Formula 4i]

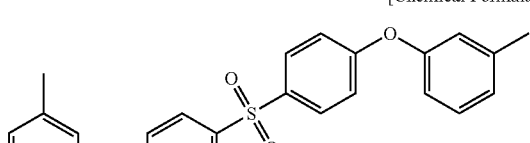

[Chemical Formula 4j]

In addition, —X$_1$ and —X$_2$ are the same or different, and each independently has any one structure selected from the following Chemical Formula 5a to Chemical Formula 5d.

[Chemical Formula 5a]

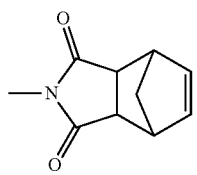

[Chemical Formula 5b]

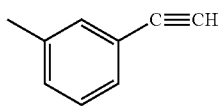

[Chemical Formula 5c]

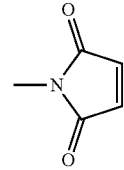

[Chemical Formula 5d]

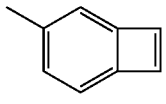

Both n1 and n4 represent 0 or 1. In addition, n2 and n3 are the same or different, and each represents an integer of 0-10,000 and at least one of n2 and n3 is not 0.

As mentioned above, one aspect of the present disclosure relates to a method for preparing a polyimide aerogel by positioning a polyamic acid solution and a non-solvent independently from each other in a sealed space, and heating them under pressure. Herein, dianhydrides, one of polyamic acid monomers, may be used alone or in combination, and diamines may also be used alone or in combination. In other words, when only one type of dianhydride is used, A$_1$ and A$_3$ are the same in the above chemical formulae. When only one type of diamine is used, $A_2$ and $A_4$ are the same. When only one type of dianhydride and only one type of diamine are used, $A_1$ and $A_3$ are the same, and $A_2$ and $A_4$ are the same.

According to an embodiment, an autoclave may be used as the sealed reactor. Herein, any one of the following (i) to (iii) may be used as the first container and the second container. (i) The first container may be a heat resistant container positioned in the autoclave, and the second container may be a space between the autoclave and the heat resistant container, (ii) the second container may be a heat resistant container positioned in the autoclave, and the first container may be a space between the autoclave and the heat resistant container, and (iii) the first container may be a first heat resistant container positioned in the autoclave, and the second container may be a second heat resistant container positioned in the autoclave.

In other words, an autoclave may be used as a sealed reactor. Herein, (i) the autoclave may be provided with a heat resistant container therein as the first container, polyamic acid solution may be received in the first container, and the space between the autoclave and the heat resistant container may be used as the second container in which the non-solvent may be received. In a variant, (ii) the autoclave may be provided with a heat resistant container therein as the second container, the non-solvent may be received in the second container, and the space between the autoclave and the heat resistant container may be used as the first container in which polyamic acid solution may be received. In another variant, (iii) the autoclave may be provided with two heat resistant containers as the first container and the second container, and polyamic acid solution and the non-solvent may be received in the first container and the second container, respectively. Among the above-mentioned embodiments, it is shown that method (iii) forms a critical point of the solvent and the non-solvent in the container and thus is more suitable for realizing a novel structure different from the structures of the conventional crosslinking processes. In addition, the aerogel obtained by method (iii) has higher thermal characteristics and mechanical properties as compared to the aerogels obtained by methods (i) and (ii).

According to another embodiment, both n1 and n4 represent 0 or 1. In other words, polyamic acid may be endcapped at its terminal. In this case, both n1 and n4 represent 1. When polyamic acid is not endcapped at its terminal, both n1 and n4 represent 0. Unlike the non-endcapped polyimide aerogel, the endcapped polyimide aerogel undergoes polymerization during its curing to form a network structure, and thus is favorable to synthesis of composites with inorganic fibers, or the like. Therefore, the endcapped polyimide aerogel is more advantageous than the non-endcapped polyimide aerogel. Particularly, according to the related art, an additional apparatus, such as a vacuum or press device, is required to obtain hybrid products by impregnating the conventional dense glass fibers and carbon fibers with a high-viscosity polymer solution. However, since the resin is present as low-molecular weight molecules in the endcapping step, the polymer solution can infiltrate into the fibers with ease. When heat curing is carried out subsequently, resin crosslinking can be accomplished while the fibers are surrounded with the solution. As a result, it is possible to produce hybrid products more efficiently.

According to still another embodiment, the solvent is selected from N-methyl pyrrolidone (NMP), N,N-dimethyl acetamide (DMAc), dimethyl formamide (DMF) and a combination of two or more of them. In addition, the non-solvent is selected from acetone, ethyl acetate and a combination of two or more of them. Particularly, when a mixed solvent containing NMP and DMAc at a volume ratio of 1:0.5-2 is used as a solvent and a mixed non-solvent containing acetone and ethyl acetate at a volume ratio of 1:0.5-2 is used as a non-solvent, it is shown that aerogels having excellent thermal characteristics and mechanical characteristics can be obtained as compared to the aerogels obtained by using a single solvent and a single non-solvent among the above-listed solvents and non-solvents.

According to still another embodiment, the heating is carried out at 200-350° C.

According to still another embodiment, the heating is carried out in a stepwise manner at 70-90° C. for 45-75 minutes, at 130-170° C. for 20-40 minutes, at 180-220° C. for 20-40 minutes, at 230-250° C. for 20-40 minutes, and at 320-380° C. for 100-140 minutes. Particularly, when heating or warming is carried out according to the above-mentioned temperature profile, it is shown that the resultant aerogel has improved thermal characteristics and significantly improved mechanical characteristics as compared to the aerogels obtained by carrying out heating at a constant rate.

According to still another embodiment, the method for preparing a polyimide aerogel further includes, before step (B), step (A) of polymerizing one type of dianhydride or two types of dianhydrides with one type of diamine or two types of diamines to obtain the polyamic acid solution. Herein, the polyamic acid has a structure represented by the following Chemical Formula 1a.

[Chemical Formula 1a]

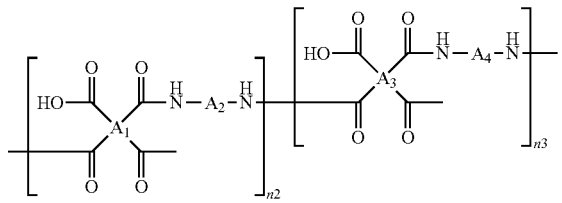

wherein

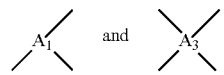

are the same or different, and each independently has any one structure selected from the above Chemical Formula 3a to Chemical formula 3f. In addition, -$A_2$- and -$A_4$- are the same or different, and each independently has any one structure selected from the above Chemical Formula 4a to Chemical Formula 4j. Further, n2 and n3 are the same or different, and each represents an integer of 0-10,000 and at least one of n2 and n3 is not 0.

As mentioned above, the method may further include a step of polymerizing dianhydrides with diamines to obtain a polyamic acid solution. In addition, the obtained polyamic acid solution may be positioned in a sealed space independently from a non-solvent, and then the polyamic acid solution and the non-solvent may be warmed under pressure to obtain an aerogel.

According to still another embodiment, the ratio of n2:n3 is 1:20-20:1.

According to still another embodiment, the method for preparing a polyimide aerogel includes, before step (B), step (A') of reacting one type of dianhydride or two types of dianhydrides with one type of diamine or two types of diamines, and step (A") of adding one type of endcapping agent or two types of endcapping agents to the reaction product solution of step (A') to perform endcapping. Herein, the polyamic acid has a structure represented by the following Chemical Formula 1. The endcapped aerogel has significantly improved thermal characteristics, such as a glass transition temperature improved by 100° C. or more, as compared to the non-endcapped aerogel, when determined by DSC. In addition, the endcapped aerogel has significantly improved mechanical characteristics and processability, and thus is shown to be a significantly preferred structure.

is difficult to obtain a desired level of mechanical or chemical characteristics of the polyimide aerogel.

According to still another embodiment, the anhydride may be one type of dianhydride or two types of dianhydrides selected from pyromellitic dianhydride (PMDA), 4,4'-oxydiphthalic dianhydride (ODPA), 3,3',4,4'-biphenyltetracarboxylic dianhydride (BPDA), 3,3',4,4'-benzophenone tetracarboxylic dianhydride (BTDA), 4,4'-(hexafluoroisopropylidene)diphthalic dianhydride (6FDA) and 3,3',4,4'-diphenylsulfone tetracarboxylic dianhydride (DSDA).

According to still another embodiment, the diamine may be one type of diamine or two types of diamines selected

[Chemical Formula 1]

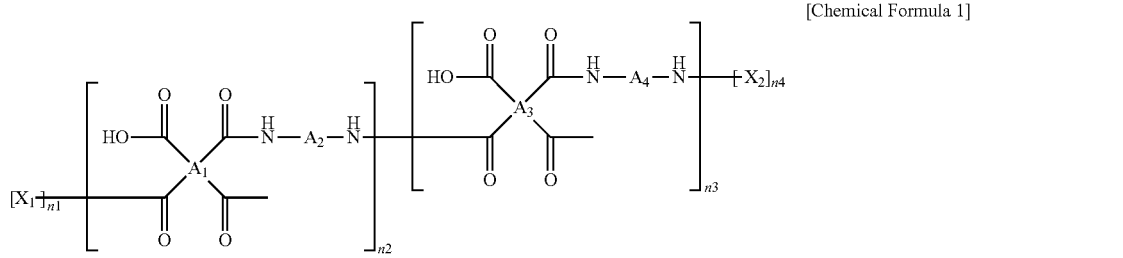

wherein

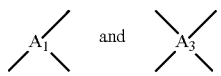

are the same or different, and each independently has any one structure selected from the above Chemical Formula 3a to Chemical formula 3f. In addition, -A$_2$- and -A$_4$- are the same or different, and each independently has any one structure selected from the above Chemical Formula 4a to Chemical Formula 4j. In addition, —X$_1$ and —X$_2$ are the same or different, and each independently has any one structure selected from the above Chemical Formula 5a to Chemical Formula 5d. Both n1 and n4 represent 1. Further, n2 and n3 are the same or different, and each represents an integer of 0-10,000 and at least one of n2 and n3 is not 0.

In a variant, the method may further include a step of further adding an endcapping agent, besides dianhydrides and diamines, to obtain an endcapped polyamic acid solution. As mentioned above, the obtained endcapped polyamic acid solution may be positioned in a sealed space independently from a non-solvent, and then the polyamic acid solution and the non-solvent may be warmed under pressure to obtain an endcapped aerogel.

Herein, it is advantageous to carry out step (A") after carrying out step (A') sufficiently, since this interrupts termination of the polymerization of polyamic acid caused by the endcapping agent.

According to still another embodiment, both n1 and n4 are 1, the ratio of n1:n2 is 1:1-1:20, the ratio of n1:n3 is 1:1-1:20, and the ratio of n2:n3 is 1:20-20:1.

According to still another embodiment, the ratio of n1:(n2+n3):n4 is 1:1-20:1. When the ratio of (n2+n3)/n1 or (n2+n3)/n4 is less than 1, it is difficult to obtain a desired level of mechanical or chemical characteristics of the polyimide aerogel. When the ratio is larger than 20, crosslinking hardly occurs by the endcapping functional groups. Thus, it from 4,4'-oxydianiline (4,4'-ODA), phenylmethyl diamine, 3,4'-oxydianiline (3,4'-ODA), 1,4-phenylene diamine (1,4-PDA), 4,4'-sulfonyl dianiline (4,4'-DDS), 2,2'-bis(3-amino-4-hydroxyphenyl)-hexafluoropropane (AHHFP), 2,2'-bis(4-aminophenyl)-hexafluoropropane (PAPFP), 4,4'-diaminodiphenylmethane (MDA), bis(4-aminophenyl) sulfone (BAPS), bis[4-(4-aminophenoxy)phenyl]sulfone and bis[4-(3-aminophenoxy) phenyl]sulfone.

According to still another embodiment, the endcapping agent may be one type of endcapping agent or two types of endcapping agents selected from monomethyl 5-norbornene-2,3-dicarboxylate (Chemical Formula 7a), dimethyl 5-norbornene-2,3-dicarboxylate (Chemical Formula 7b), cis-5-norbornene-endo-2,3-dicarboxylic acid (Chemical Formula 7c), cis-norbonene-endo-2,3-dicarboxylic anhydride (Chemical Formula 7d), cis-norbornene-exo-2,3-dicarboxylic anhydride (Chemical Formula 7e), 3-aminophenylacetylene (Chemical Formula 7f), maleic anhydride (Chemical Formula 7g) and 3-aminophenyl cyclobutene (Chemical Formula 7h). Among those compounds, the compounds represented by Chemical Formula 7a to Chemical Formula 7e are endcapped to form a structure represented by Chemical Formula 5a, and the compounds represented by Chemical Formula 7f to 7h are endcapped to form structures represented by Chemical Formula 5b to Chemical Formula 5d, respectively.

[Chemical Formula 7a]

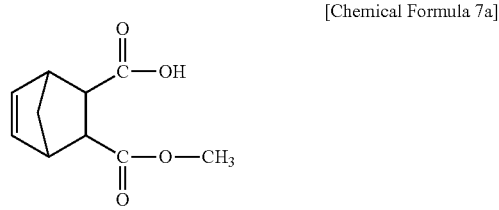

[Chemical Formula 7b]
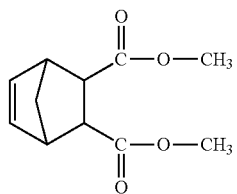

[Chemical Formula 7c]
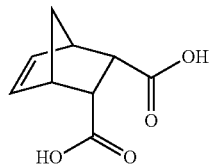

[Chemical Formula 7d]
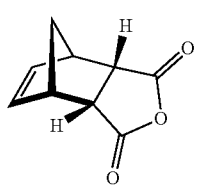

[Chemical Formula 7e]
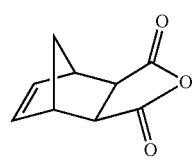

[Chemical Formula 7f]
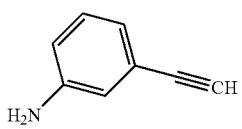

[Chemical Formula 7g]
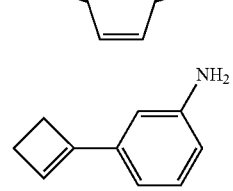

[Chemical Formula 7h]
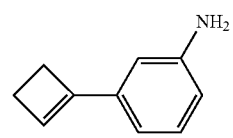

According to still another embodiment, the polyamic acid solution may include polyamic acid in an amount of 5-50 wt % based on the total weight of the solution.

According to still another embodiment, the polyamic acid solution may further include a filler. Herein, the filler is selected from silica, clay, zirconium and a combination of two or more of them, and may be used in an amount of 0.01-50 parts by weight based on 100 parts by weight of the polyamic acid solution.

According to still another embodiment, the filler is introduced in step (A) or step (A'). Thus, it is preferred to introduce the filler after one monomer of the dianhydride and diamine is dissolved and before the other monomer is added. In other words, the filler is added after the dianhydride is dissolved and before the diamine is introduced, or after the diamine is dissolved and before the dianyhydride is introduced. This is preferred since the thermal characteristics and mechanical characteristics of the aerogel can be further improved.

In another aspect, there is provided a polyimide aerogel represented by the following Chemical Formula 2.

[Chemical Formula 2]

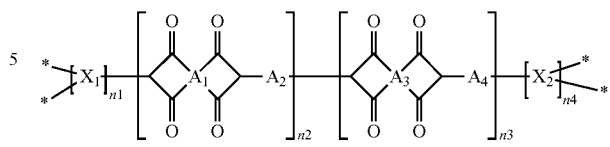

wherein

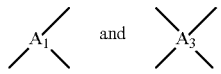 and 

are the same or different, and each independently has any one structure selected from the above Chemical Formula 3a to Chemical formula 3f. In addition, -$A_2$- and -$A_4$- are the same or different, and each independently has any one structure selected from the following Chemical Formula 4a to Chemical Formula 4j.

Meanwhile,

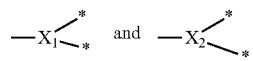 and 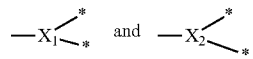

are the same or different, and each independently has a structure represented by the following Chemical Formula 6.

[Chemical Formula 6]

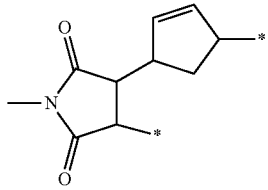

wherein both n1 and n4 represent 0 or 1. In addition, n2 and n3 are the same or different, and each represents an integer of 0-10,000 and at least one of n2 and n3 is not 0.

According to another embodiment, the endcapped polyimide aerogel is a polyimide aerogel which has the following physical properties: a particle size of 3-6 μm as determined by dynamic light scattering, a porosity of 70%-90% as determined by the BET method and mercury intrusion porosimetry, a specific surface area of 95-110 m²/g as determined by the nitrogen BET method, a pore size of 2-100 nm as determined by the BJH method, a maximum spreading pore size of 2-7 mm as determined by the BJH method, a pore size of 4-100 nm as determined by the mercury intrusion method, a maximum spreading pore size of 10-20 nm as determined by the BJH method, a 1% decomposition temperature of 500-515° C. as determined by TGA analysis, a 10% decomposition temperature of 560-570° C. as determined by TGA analysis, and a glass transition temperature of 430-450° C. as determined by DSC analysis.

According to still another embodiment, the polyimide aerogel has a structure represented by the following Chemical Formula 2a.

[Chemical Formula 2a]

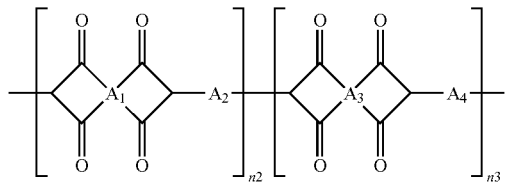

wherein

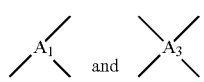

are the same or different, and each independently has any one structure selected from the above Chemical Formula 3a to Chemical formula 3f. In addition, -A$_2$- and -A$_4$- are the same or different, and each independently has any one structure selected from the above Chemical Formula 4a to Chemical Formula 4j. In addition, n2 and n3 are the same or different, and each represents an integer of 0-10,000 and at least one of n2 and n3 is not 0.

According to still another embodiment, the non-end-capped polyimide aerogel is a polyimide aerogel which has the following physical properties: a particle size of 3-6 μm as determined by dynamic light scattering, a porosity of 70%-90% as determined by the BET method and mercury intrusion porosimetry, a specific surface area of 95-110 m$^2$/g as determined by the nitrogen BET method, a pore size of 2-100 nm as determined by the BJH method, a maximum spreading pore size of 2-7 mm as determined by the BJH method, a pore size of 4-100 nm as determined by the mercury intrusion method, a maximum spreading pore size of 10-20 nm as determined by the BJH method, a 1% decomposition temperature of 500-515° C. as determined by TGA analysis, a 10% decomposition temperature of 560-570° C. as determined by TGA analysis, and a glass transition temperature of 320-340° C. as determined by DSC analysis.

According to still another embodiment, the polyimide aerogel is a polyamide gel obtained according to each of various embodiments of the present disclosure.

MODES FOR INVENTION

Hereinafter, exemplary embodiments of the present disclosure will be explained in detail with reference to the accompanying drawings. The following examples are provided so that the present disclosure will be thorough and complete, and will fully convey the scope of the present disclosure to those skilled in the art. However, the present disclosure may be embodied in many different forms and should not be construed as limited to the exemplary embodiments set forth therein.

Example 1

(1) First, 0.801 g (3 mmol) of 4,4'-oxydianiline (4,4'-ODA) was introduced to a 50 mL Erlenmeyer flask and 10 mL of N-methyl-2-pyrrolidone (NMP) was introduced together as a polar solvent, and agitation was carried out until they were dissolved. Next, 2 mmol of pyromellitic dianhydride (PMDA) was introduced thereto and the mixture was agitated at 0° C. for 12 hours under nitrogen atmosphere to obtain a polyamic acid solution.

(2) The polyamic acid obtained as described above was introduced to a heat resistant container positioned in an autoclave, acetone was introduced between the autoclave and the heat resistant container, and then the autoclave was heat treated in a stepwise manner at 80° C. for 1 hour, at 150° C. for 30 minutes, at 200° C. for 30 minutes, at 250° C. for 30 minutes, and at 350° C. for 2 hours. In this manner, imidization was carried out to obtain a polyimide polymer in the form of an aerogel.

(3) To collect the obtained aerogel, the aerogel was dried in a vacuum at 80° C. for 24 hours. A micro-sized spherical polyimide aerogel having nano-sized pores was obtained.

Test Example 1

(1) Thermogravimetric Analysis

To determine the thermal stability of the nanoporous microspherical polyimide aerogel obtained as described above, variations in weight of the aerogel were determined while it was heated to 800° C. As shown in FIG. 1, the nanoporous microspherical polyimide aerogel shows a 1% weight loss temperature and a 5% weight loss temperature of 520° C. and 580° C., respectively. This suggests that the aerogel has significantly high thermal stability even at high temperature.

(2) Dynamic Light Scattering Luminance Analysis

Figure 2:
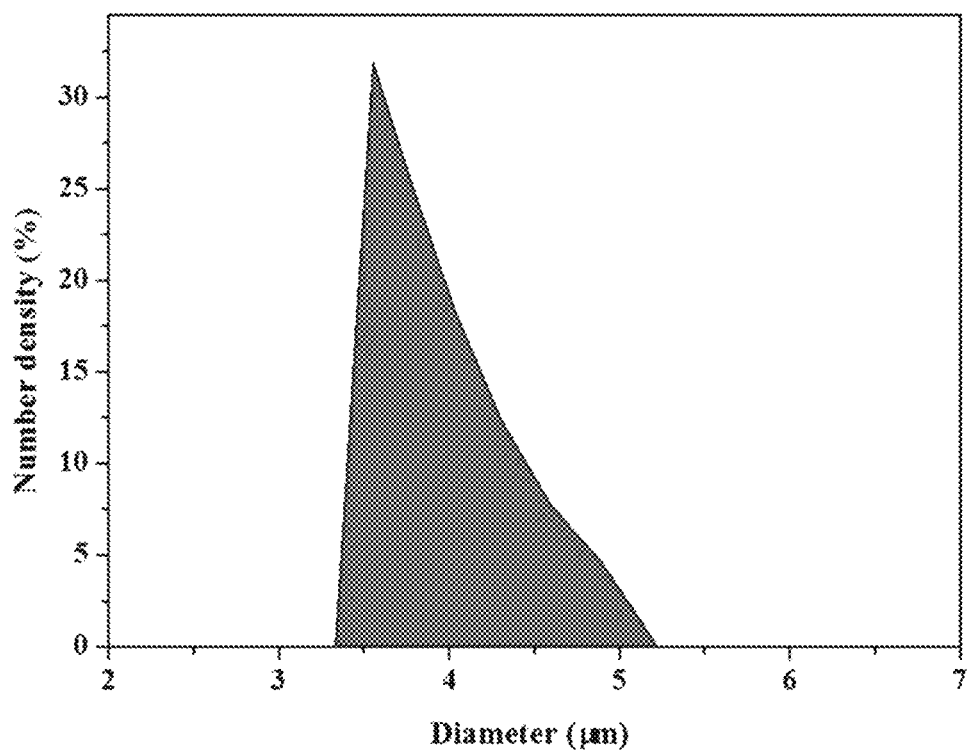
FIG. 2 illustrates the particle size distribution of the nanoporous microspherical polyimide aerogel according to an embodiment of the present disclosure.

A dynamic light scattering photometer was used to analyze the particle size and distribution of the nanoporous microspherical polyimide aerogel obtained as described above. As shown in FIG. 2, the nanoporous microspherical aerogel has a significantly uniform size of 3.5-5.5 μm.

(3) SEM Analysis

Figure 3:
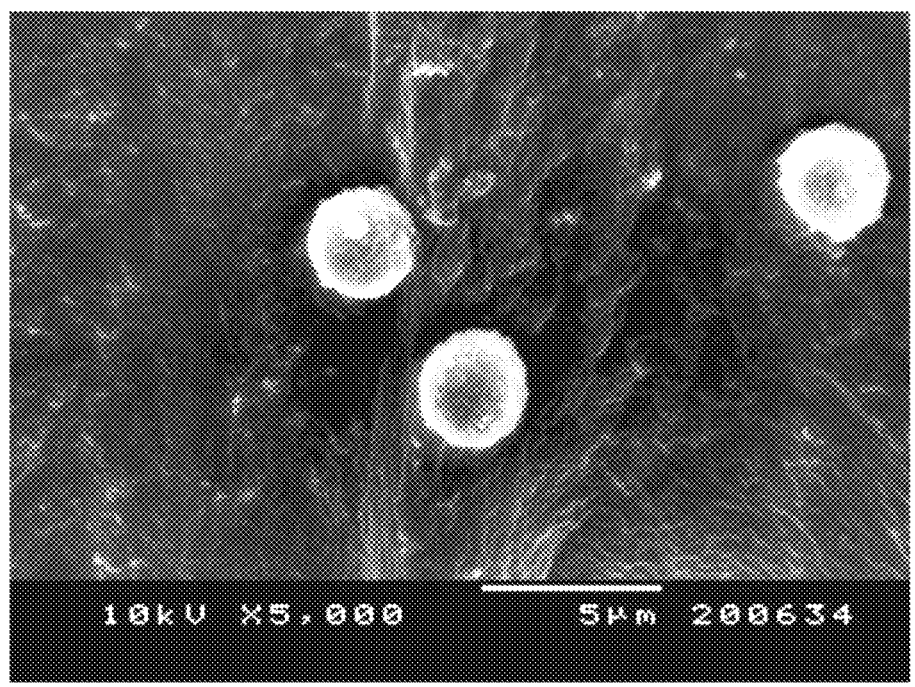
FIG. 3 is a scanning electron microscopic (SEM) image of the nanoporous microspherical polyimide aerogel according to an embodiment of the present disclosure.
Figure 4:
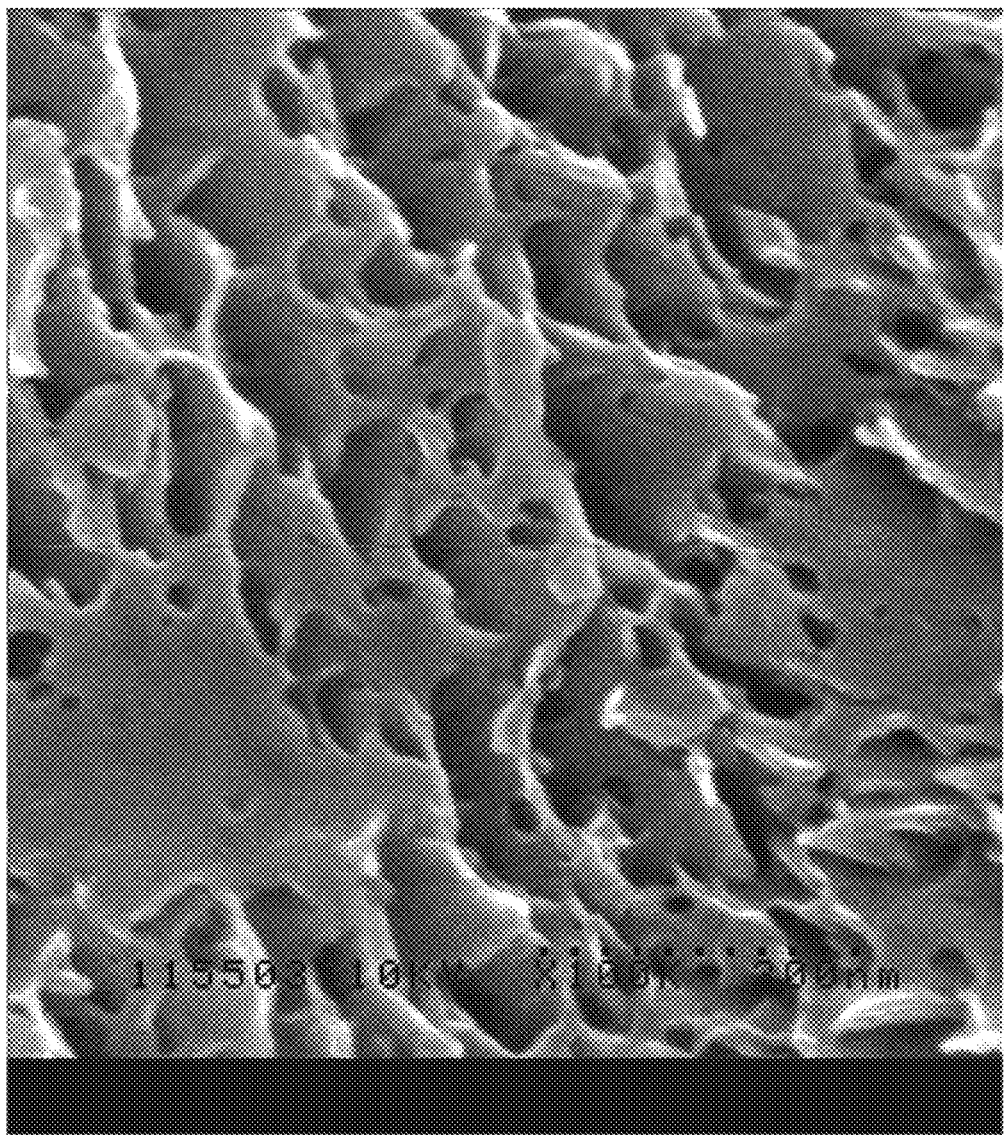
FIG. 4 is a scanning electron microscopic (SEM) image of the nano-sized pores present on the surface of the nanoporous microspherical polyimide aerogel according to an embodiment of the present disclosure.

The nanoporous microspherical polyimide aerogel obtained as described above was subjected to scanning electron microscopy (SEM). As shown in FIG. 3, the nanoporous microspherical polyimide aerogel includes micrometer-sized uniform spherical particles. In addition, as shown in FIG. 4, the nanoporous microspherical polyimide aerogel has nano-sized pores formed on the surface thereof.

(4) Determination of Porosity and Surface Area

The porosity and surface area of the nanoporous microspherical polyimide aerogel obtained as described above were determined by using the BET analysis method and mercury intrusion method. The results are shown in the following Table 1.

TABLE 1

| Porosity | Surface Area |
| --- | --- |
| 80% | 103 m$^2$/g |

The invention claimed is:

1. A method for preparing a polyimide aerogel, which comprises step (B) of heating a first container and a second container positioned in a sealed reactor, wherein the first container receives a polyamic acid solution containing a polyamic acid represented by the following Chemical Formula 1 and a solvent, and the second container receives a non-solvent:

[Chemical Formula 1]

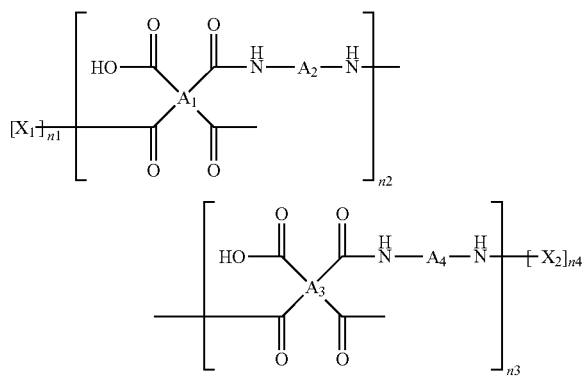

wherein

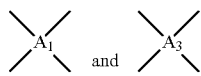

are the same or different, and each independently has any one structure selected from the following Chemical Formula 3a to Chemical Formula 3f;

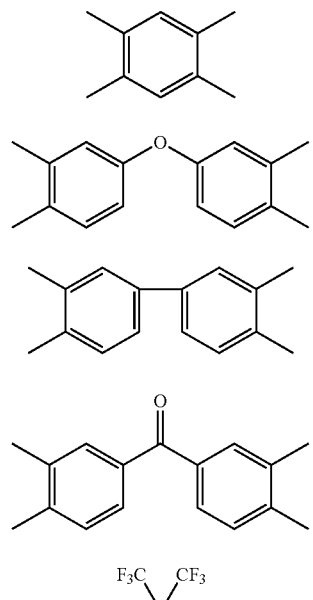

-$A_2$- and -$A_4$- are the same or different, and each independently has any one structure selected from the following Chemical Formula 4a to Chemical Formula 4j:

[Chemical Formula 4a]

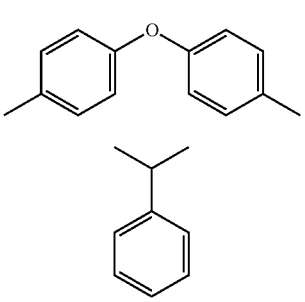

[Chemical Formula 4b]

[Chemical Formula 4c]

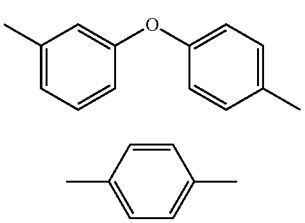

[Chemical Formula 4d]

[Chemical Formula 4e]

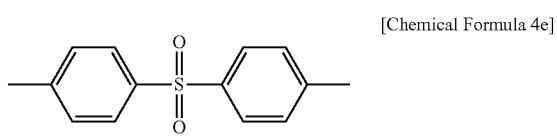

[Chemical Formula 4f]

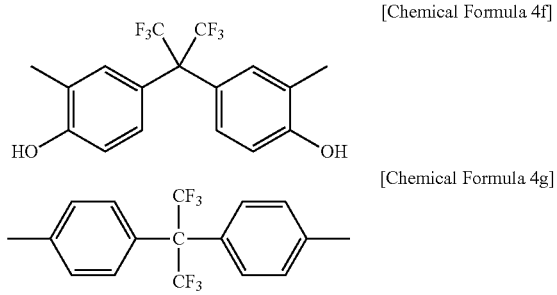

[Chemical Formula 4g]

[Chemical Formula 4h]

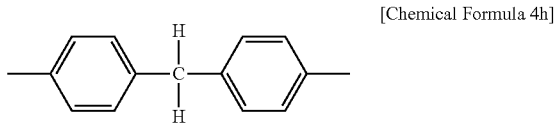

[Chemical Formula 4i]

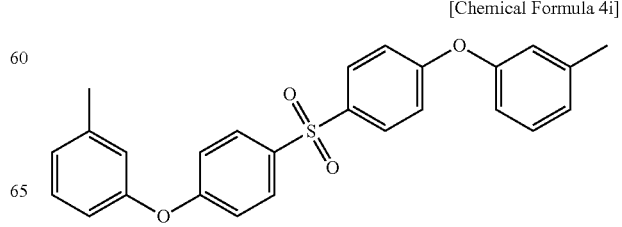

[Chemical Formula 4j]

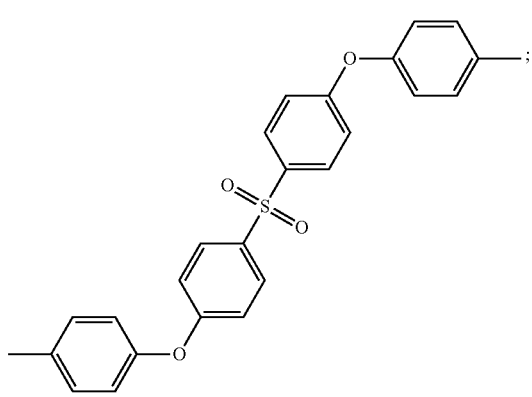

—$X_1$ and —$X_2$ are the same or different, and each independently has any one structure selected from the following Chemical Formula 5a to Chemical Formula 5d:

[Chemical Formula 5a]

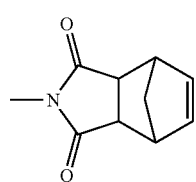

[Chemical Formula 5b]

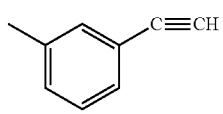

[Chemical Formula 5c]

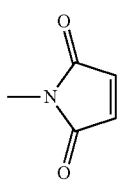

[Chemical Formula 5d]

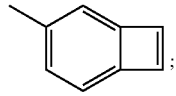

both n1 and n4 represent 0 or 1; and n2 and n3 are the same or different, and each represents an integer of 0-10,000 and at least one of n2 and n3 is not 0, the following clause is included: wherein the solvent is a mixed solvent containing N-methyl pyrrolidone (NMP) and N,N-dimethyl acetamide (DMAc) at a volume ratio of 1:0.5-2; the non-solvent is a mixed non-solvent containing acetone and ethyl acetate at a volume ratio of 1:0.5-2; the heating is carried out at a heating rate of 1-50° C./minute; and the heating is carried out in a stepwise manner at 70-90° C. for 45-75 minutes, at 130-170° C. for 20-40 minutes, at 180-220° C. for 20-40 minutes, at 230-250° C. for 20-40 minutes, and at 320-380° C. for 100-140 minutes.

2. The method for preparing a polyimide aerogel according to claim 1, wherein the sealed container is an autoclave; and the first container and the second container are selected from the following (i) to (iii):

(i) the first container is a heat resistant container positioned in the autoclave, and the second container is a space between the autoclave and the heat resistant container;

(ii) the second container is a heat resistant container positioned in the autoclave, and the first container is a space between the autoclave and the heat resistant container; and (iii) the first container is a first heat resistant container positioned in the autoclave, and the second container is a second heat resistant container positioned in the autoclave.

* * * * *